United States Patent
Hsieh

(10) Patent No.: US 8,728,584 B2
(45) Date of Patent: May 20, 2014

(54) METHOD FOR PATTERNING POLYMER SURFACE

(75) Inventor: Shu-Chen Hsieh, Kaohsiung (TW)

(73) Assignee: National Sun Yat-Sen University, Kaohsiung (TW)

( * ) Notice: Subject to any disclaimer, the term of this patent is extended or adjusted under 35 U.S.C. 154(b) by 768 days.

(21) Appl. No.: 12/576,666

(22) Filed: Oct. 9, 2009

(65) Prior Publication Data

US 2010/0227079 A1    Sep. 9, 2010

(30) Foreign Application Priority Data

Mar. 9, 2009    (TW) ................ 98107521 A

(51) Int. Cl.
  *H05H 1/00*    (2006.01)
  *C03C 15/00*   (2006.01)
  *C03C 25/68*   (2006.01)

(52) U.S. Cl.
  USPC ............ 427/536; 427/533; 427/535; 216/45; 216/54; 216/67

(58) Field of Classification Search
  USPC ............ 216/12, 41, 45, 51, 54, 67, 68, 69; 427/2.14, 2.24, 446, 447, 448, 533, 427/535, 536
  See application file for complete search history.

(56) References Cited

U.S. PATENT DOCUMENTS

| | | | |
|---|---|---|---|
| 6,358,557 B1 * | 3/2002 | Wang et al. | 427/2.24 |
| 6,893,966 B2 | 5/2005 | Delamarche et al. | |
| 2005/0244452 A1 * | 11/2005 | Gonsalves | 424/423 |

FOREIGN PATENT DOCUMENTS

TW    2006-33610    9/2006

OTHER PUBLICATIONS

Hsieh et al; "Plasma induced patterning of polydimethylsiloxane surfaces"; Materials Science and Engineering B, vol. 156, pp. 18-23; Available online on Nov. 18, 2008.*
Malkov et al; "Pulsed-Plasma-Induced Micropatterning with Alternating Hydrophilic and Hydrophobic Surface Chemistries"; Plasma Processes and Polymers, vol. 5, pp. 129-145; Available online on Jan. 22, 2008.*
Morra et al; "Cell Adhesion Micropatterning by Plasma Treatment of Alginate Coated Surfaces"; Plasmas and Polymers, vol. 7, No. 2; Jun. 2002.*
Sardella et al; Plasma-Aided Micro- and Nanopatterning Processes for Biomedical Application; Plasma Processes and Polymers, vol. 3, Issue 6-7, pp. 456-469; Aug. 15, 2006.*
Hsieh et al., "Plasma Induced Patterning of Polydimethylsiloxane Surface", Material Science and Engineering B 156, 2009 p. 18-23.

\* cited by examiner

*Primary Examiner* — Michael Wieczorek
(74) *Attorney, Agent, or Firm* — Birch, Stewart, Kolasch & Birch, LLP

(57) ABSTRACT

The invention provides a method for patterning a polymer surface. A polymer layer is formed on a substrate. A conductive grid with a mesh pattern is placed on the polymer layer. The mesh pattern is transferred to the polymer layer by a plasma treatment. The conductive grid is then removed.

13 Claims, 7 Drawing Sheets

METHOD FOR PATTERNING POLYMER SURFACE

CROSS REFERENCE TO RELATED APPLICATIONS

This Application claims priority of Taiwan Patent Application No. 098107521, filed on Mar. 9, 2009, the entirety of which is incorporated by reference herein.

BACKGROUND OF THE INVENTION

1. Field of the Invention

The present invention relates to a patterning method, and in particular relates to a method for patterning a polymer surface.

2. Description of the Related Art

Materials and substrates with engineered surface patterns are used extensively for applications in electronic, optical, magnetic, chemical, and biological devices. In particular, surfaces with patterned chemical functionalities can serve as templates for directed self-assembly of nanoparticles, biomolecules, and antibodies, and are employed in the development of micro-scale biochips and sensor devices.

A conventional method for patterning a polymer surface is described as follows. A silicon mold is fabricated by a photolithography process. The polymer solution is poured into the silicon mold. Then, a patterned polymer is obtained by baking the polymer solution at a high temperature. However, the photolithography process must be performed in a clean room environment with specialized photolithography equipment, which is costly.

Laser beam micro-matching technology is another method for patterning a polymer surface. However, laser equipment is expensive and production output is slow, thereby, decreasing fabrication efficiency.

U.S. Pat. No. 6,893,966 discloses a method for patterning a metal layer using a microcontact printing (MCP) process, wherein a patterned polydimethylsiloxane (PDMS) with a specific compound is used as a stamp. The specific compound is then transferred to the surface of the metal layer to form a self-assembly monolayer on the metal layer.

Taiwan publication number 200633610 discloses a soft lithographic stamp and a method for the manufacturing thereof. The stamp is comprised of blocking regions and printing regions. Due to the specific properties of the blocking regions, a patterned substrate is obtained by transferring the printing regions to a substrate. While mass production is convenient and fast, patterned sizes are limited (larger than μm-scale).

Accordingly, there is a need to develop a method for patterning a polymer surface, which is not only simpler than the conventional methods, but also applicable to smaller sized patterns (smaller than μm-scale).

BRIEF SUMMARY OF THE INVENTION

The invention provides a method for patterning a polymer surface, comprising: providing a substrate; forming a polymer layer on the substrate; placing a conductive grid on the polymer layer, wherein the conductive grid has a mesh pattern; performing a plasma treatment on the polymer layer to transfer the mesh pattern to the polymer layer; and removing the conductive grid.

A detailed description is given in the following embodiments with reference to the accompanying drawings.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
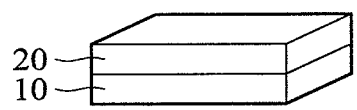
FIG. 1A to FIG. 1C show cross-sectional schematic representations of a method for patterning a polymer surface in accordance with the invention.
Figure 1B:
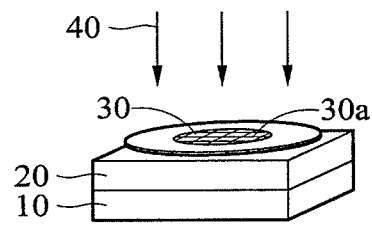
Figure 1C:
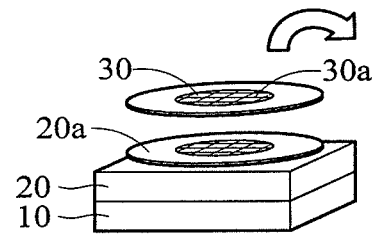

The invention provides a method for patterning a polymer surface as shown in FIG. 1A to FIG. 1C. Referring to FIG. 1A, a substrate 10 is provided, such as a glass or a plastic substrate. The substrate 10 is used as a loading substrate for sequential processes. Then, a polymer layer 20 is formed on the substrate 10. For example, a polymer solution is poured onto the substrate 10, and then the polymer is solidified by baking at a high temperature. The baking temperature and time may be adjusted according to the components of the polymer. In one embodiment, the polymer is baked at about 50° to 150° for 0.5 hour to 4 hour. The polymer 20 may comprise polydimethylsiloxane (PDMS), poly(methyl methacrylate (PMMA), poly(3,4-ethylenedioxythiophene): poly (styrenesulfonate) (PEDOT:PSS), polyvinyl alcohol (PVA), (polyvinyl carbazole (PVK), polytetrafluoroethylene (PTFE), polyethyleneimine (PEI), polystyrene (PS) or polyethylene terephthalate (PET). Note that the material of the polymer 20 is not limited, other polymers suitable for microfluidic devices may be used. In one embodiment, the preferred polymer is polydimethylsiloxane (PDMS).

In one embodiment, the polymer has a planar surface (also called a 2-dimensional (2D) surface). In another embodiment, before performing the patterning method, the polymer has a textured surface (also called 3-dimensional (3D) surface). The fabrication method for a textured polymer surface is as follow. A commercial recordable compact disk, such as CD or VCD, is used as a template. A polymer solution is poured onto the template. Then, a textured (3D) surface of the polymer is obtained by baking the polymer solution at a high temperature.

As shown in FIG. 1B, a conductive grid 30 is placed on the polymer layer 20, wherein the conductive grid 30 has a specific mesh pattern 30a and the size of the specific mesh pattern 30a is smaller than μm-scale. The conductive grid 30 is preferably a metal grid, made of material such as copper, gold, molybdenum, nickel or combinations thereof. However, the material of the conductive grid 30 is not limited, and other conductive materials are included within the scope of the invention. The specific mesh pattern 30a may comprise a rectangular, rhombus, circular, polygon or irregular shape. Any specific mesh pattern 30a can be designed according to application.

Note that before placing the conductive grid 30 on the polymer layer 20, the method further comprises applying deionized water on the polymer layer 20. Additionally, after placing the conductive grid 30 on the polymer layer 20, the method further comprises using nitrogen gas to dry the deionized water. Thus, the adhesion between the polymer layer 20 and the conductive grid 30 is improved by wetting the surface of the polymer layer 20, and the reproducibility of the patterned polymer is improved.

Next, a step is employed by performing a plasma treatment on the polymer layer 20 to transfer the specific mesh pattern 30a to the polymer layer 20. Therefore, a specific pattern 20a is formed on the surface of the polymer layer 20. To reduce fabrication cost and simplify process steps, the plasma treatment is preferably an air plasma treatment, but not limited to the air plasma treatment, wherein the air plasma treatment is conducted under a power of about 2 W-30 W, preferably 5 W-20 W, with an exposure time of about 0.5 min-10 min, and a pressure of about 5 Pa-200 Pa, preferably 20 Pa-100 Pa.

Referring to FIG. 1C, the conductive grid 30 is removed to expose the specific pattern 20a of the polymer layer 20. Various specific mesh patterns 20a can be fabricated by the plasma treatment of the invention, wherein the specific mesh pattern 20a may be a positive pattern (e.g. hill) or a negative pattern (e.g. trench) formed on the polymer layer 20 with a height of about 5 nm to 150 nm.

Figure 1D:
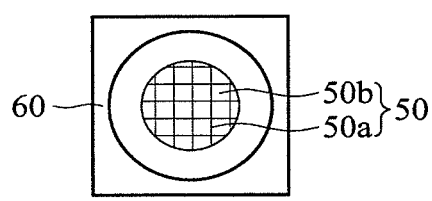
FIG. 1D shows a top-view schematic representation of a patterned polymer surface in accordance with the invention

In order to simplify the following description, the polymer is divided into three regions after the plasma treatment. Referring to FIG. 1D, first regions are called covered regions 50a, which are directly under the conductive grid 30 and covered by the conductive grid 30. Second regions are called exposed regions 50b, which are also under the conductive grid 30, but not covered by the conductive grid 30. Combinations of the covered regions 50a and the exposed regions 50b are called grid regions 50. Third regions are called non-grid regions 60, which are outside of the conductive grid 30.

Figure 2A:
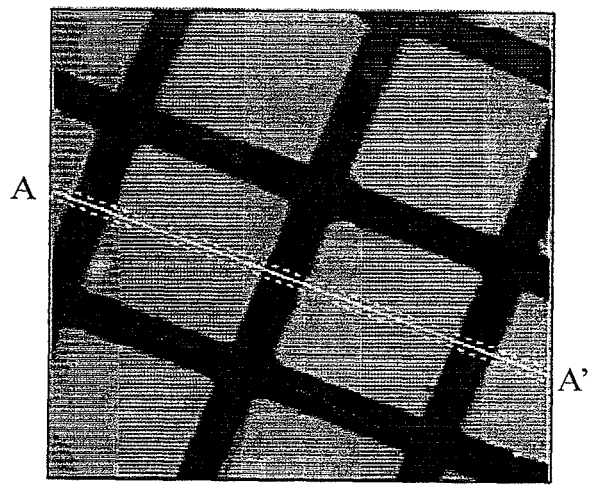
FIG. 2A and FIG. 2B show AFM images of a patterned 2D PDMS surface in accordance with the invention.
Figure 2B:
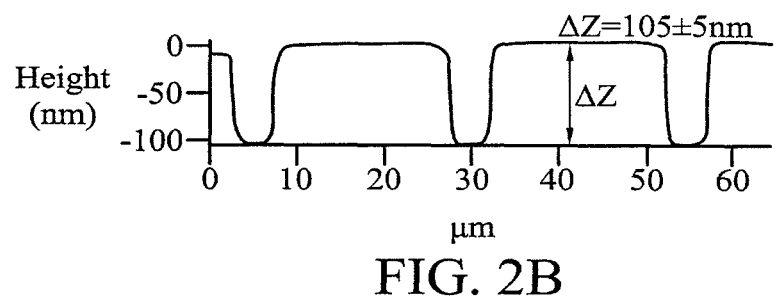

In order to understand the physical property of the polymer layer 20 after the plasma treatment, topography images of the polymer layer 20 are obtained by an AFM (atomic force microscopy). FIG. 2A shows an AFM topography image of a PDMS polymer after the plasma treatment, wherein the black colored regions are the covered regions and the gray colored regions are the exposed regions. FIG. 2B shows a height image across a line section AA' in FIG. 2A, wherein the black colored regions are lower than the gray colored regions and differences in height are about 40 nm-120 nm. The data shows that the covered regions are lower than the exposed regions to form trenches (also called negative patterns) on the polymer layer after the plasma treatment. In another embodiment, when the polymer layer is polytetrafluoroethylene (PTFE), a negative pattern is formed on the PTFE and differences in height are about 20 nm-80 nm.

The differences in height are created by the following process. The original well-ordered atomic surface bonding of the PDMS is disrupted by plasma-generated UV photons to swell the PDMS. The covered regions of the PDMS that are masked by the conductive grid 30 are not subjected to UV photons bombardment, and thus the swelling conditions in the exposed regions are greater than that of the covered regions. The physical patterns (differences in height) are created by the plasma treatment. Therefore, the conductive grid 30 may serve as a true mask.

In yet another embodiment, when the polymer is PMMA, the covered regions are higher than the exposed regions and hills (also called positive patterns) are formed on the PMMA and differences in height are about 10 nm-40 nm. In this case, the positive pattern is created by the following process. The surface of the exposed regions on the PMMA is denser (e.g. shrinkage) than that of the covered regions due to the inherent property of the PMMA after the plasma treatment. Thus, the covered regions are higher than the exposed regions. In another embodiment, when the polymer is polyethylene terephthalate (PET), a positive pattern is formed with differences in height of about 5 nm-30 nm.

Regardless of the materials used, the positive patterns or the negative patterns with differences in height of about 5 nm-150 nm are formed on the surface of the polymer layer by the plasma treatment in accordance with the invention. Note that the positive patterns or negative patterns formed on the surface of the polymer layer and the differences in height may depend on the material of the polymer used.

In order to understand the chemical property of the surface of the polymer layer further, a water contact angle of the polymer layer is measured before and after the plasma treatment.

In one embodiment, before the plasma treatment, a water contact angle of the PDMS is about $100°$. After the plasma treatment, a water contact angle of grid regions 50 is about $80°$-$90°$, and a water contact angle of the non-grid regions 60 is about $30°$-$40°$. The above results indicate that the original hydrophobic surface ($CH_3$ groups) of the PDMS is converted to hydrophilic surface (COOH groups) by the plasma treatment.

However, because the diameter of the water drop of the water contact angle instrument is about 1.0 mm-3.0 mm, which is not small enough to distinguish between the covered regions 50a and the exposed regions 50b, the hydrophilicity of the covered regions 50a or the exposed regions 50b are not distinguished by the water contact angle data. Therefore, friction images are further measured by an AFM to observe the hydrophilicity of individual regions (the covered regions 50a or the exposed regions 50b). It is well known by those skilled in the art that higher hydrophilicity regions exhibit higher friction.

The frication images show that the frication of the covered regions 50a is higher than that of the exposed regions 50b. Thus, the hydrophilicity of the covered regions 50a is higher than that of the exposed regions 50b.

Charging of the conductive grid from exposure to the plasma induces an electro-oxidation reaction between the conductive grid 30 and the polymer layer 20. Thus, the covered regions 50a directly under the conductive grid 30 have higher hydrophilicity.

The data of the water contact angle also corresponds with the results of the frication images. Before the plasma treatment, the overall surface of the polymer layer 20 is hydrophobic. After plasma treatment, the non-grid regions 60 become hydrophilic, but the grid regions 50 have different hydrophilicity in the covered regions 50a and the exposed regions 50b due to the plasma induced electro-oxidation reaction. Therefore, the water contact angle of the grid regions 50 is larger than that of the non-grid regions 60.

According to the method of patterning a polymer surface of the invention, the hydrophilic differences on specific position of the polymer layer are formed by the conductive grid 30. The method also provides a quick and simple process for creating physical patterns (e.g. height differences) and chemical patterns (hydrophilic difference) on the polymer layer 20 for application in micro-fluidic systems.

Additionally, four main advantages of the method of patterning a polymer surface are as follows:

(1) A simple fabricating method is provided, wherein the patterned polymer surface is formed by an air plasma treatment by using the conductive grid as a mask;

(2) Physical patterns (e.g. positive or negative patterns with different heights) are formed on the surface of the polymer layer according to the material of the polymer layer chosen;

(3) The surface of the polymer layer has different chemical patterns (e.g. hydrophilicity), formed by using the conductive grid as mask; and (4) Smaller than μm-scale pattern are fabricated on the polymer layer.

EXAMPLE

Example 1

Fabrication of Patterned Planar (2D) Polymer Layer

The polymer solutions in Table 1 are poured onto a clean glass and then cured in an oven (Memmert, Germany) at 50°-150° for 0.5-4 hours to obtain the non-patterned planar (2D) polymer layers.

10-60 μL of the deionized water (Millpore, Milli-Q purification system, R□ 18.2Ω) is applied on the non-patterned polymer layers and then the copper TEM grid (1000 mesh EMITECH-squaretype-3.2 mm diameter) is placed on the deionized water. Excess water on the polymer layer is removed by the lens paper, and then the polymer layer is dried by purging with nitrogen. Next, the polymer layers covered with the copper TEM grid are exposed to a low-pressure air plasma treatment (Harrick Scientific Products, Inc. Model PDC-001) to obtain the patterned planar (2D) polymer layers, wherein the plasma treatment is conducted under a pressure of about 20 Pa-100 Pa, at a power of about 5 W-20 W, and at an exposure time of about 30 s-5 min.

Additionally, various patterned planar (2D) PDMS layers are obtained by using an Au grid, Mo grid or Ni grid as a mask.

TABLE 1

| Sample | Polymer | Structure |
|---|---|---|
| 1 | Polydimethylsiloxane (PDMS) | |
| 2 | poly(methyl methacrylate (PMMA) | |
| 3 | poly(3,4-ethylenedioxythiophene): poly(styrenesulfonate), (PEDOT:PSS) | |
| 4 | polyvinyl alcohol (PVA) | |
| 5 | polyvinyl carbazole (PVK) | |
| 6 | polytetrafluoroethylene (PTFE) | |
| 7 | polyethyleneimine (PEI) | |

TABLE 1-continued

| Sample | Polymer | Structure |
|---|---|---|
| 8 | polystyrene (PS) | 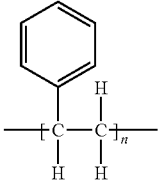 |
| 9 | polyethylene terephthalate (PET) | 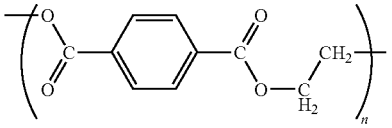 |

Example 2

Fabrication of Patterned Textured (3D) Polymer Layer

The Al and polycarbonate layer of the CD-R or VCD are separated and the Al surface is used as a master. Next, a PDMS solution is poured into the Al surface and then cured in an oven (Memmert, Germany) at 50°-150° for 0.5-4 hours to obtain the non-patterned textured (3D) PDMS layers.

The patterned textured (3D) PDMS layers are obtained by following the methods as described in Example 1.

Example 3

Measurements of Water Contact Angle

As shown in Table 2, water contact angle measurements are performed on the various 2D polymers of Example 1 and 3D PDMS layers of Example 2 before and after the plasma treatment using a PGX model instrument (Belgium, Deerlijk) at room temperature.

TABLE 2

| | | Water contact angle | | |
|---|---|---|---|---|
| Sample | Polymer | Before plasma treatment | After plasma treatment (grid regions) | After plasma treatment (non-grid regions)[1] |
| 1 | PDMS | 102 | 95 | 40 |
| 2 | PMMA | 77 | 45 | 40 |
| 3 | PEDOT:PSS | 50 | 22 | 28 |
| 4 | PVA | 69 | 26 | 9 |
| 5 | PVK | 85 | <8 | <8 |
| 6 | PTFE | 115 | 143 | 115 |
| 7 | PEI | 23 | <8 | <8 |
| 8 | PS | 92 | 32 | 9 |
| 9 | PET | 84 | 54 | 42 |
| 10 | 3D PDMS | 96 | 90 | 38 |

[1]The experiment is a blank experiment. The blank experiment is performed by exposing the polymer with no grid to a plasma treatment.

From the above results, it is shown that after the plasma treatment the water contact angle of the PDMS is changed from 102° to 95° and 40°. Therefore, the original hydrophobic surface of the PDMS is converted to a hydrophilic surface. Further, there are specific hydrophilic distributions on the polymer layer because the hydrophilicity of the non-grid regions (40°) is higher than that of the grid regions (95°). Other polymer layers have similar results like the PDMS.

Additionally, note that because the main components of sample 3 in table 2 are water, a contact angle of the sample 3 is difficult to measure. Thus, after the plasma treatment, the water contact angle of the grid regions of sample 3 is close to that of the non-grid regions.

Example 4

Measurements of the Atomic Force Microscopy (AFM)

The patterned polymer layers are imaged with an AFM operation in a contact model under ambient conditions. The scan angle is set to 90° so that the fast scan direction is perpendicular to the long axis of the cantilever. This allowed simultaneous measurement of the topography and lateral force (friction). A silicon cantilever (Olympus, AC 240) with a nominal spring constant of 1 N/m is used for all images with a scan rate of 1.0 Hz and image pixel density of 512×512. The results are shown in Table 3 and FIG. 3A-FIG. 3D (60 μm×60 μm).

Table 3 shows the positive patterns or negative patterns and differences in height in Example 1 and Example 2. As shown in Table 3, the positive patterns or the negative patterns with differences in height of about 5 nm-150 nm are formed on the surface of the polymer layer by the plasma treatment of the invention.

TABLE 3

| Sample | Polymer | Positive patterns or negative patterns | Differences in height (nm) |
|---|---|---|---|
| 1 | PDMS | negative patterns | 40~120 |
| 2 | PMMA | positive patterns | 10~40 |
| 3 | PEDOT:PSS | negative patterns | 5~40 |
| 4 | PVA | negative patterns | 20~40 |
| 5 | PVK | negative patterns | 20~80 |
| 6 | PTFE | negative patterns | 20~80 |
| 7 | PEI | negative patterns | 5~10 |
| 8 | PS | negative patterns | 5~8 |
| 9 | PET | positive patterns | 5~30 |
| 10 | 3D PDMS | negative patterns | 80~110 |

Figure 3A:
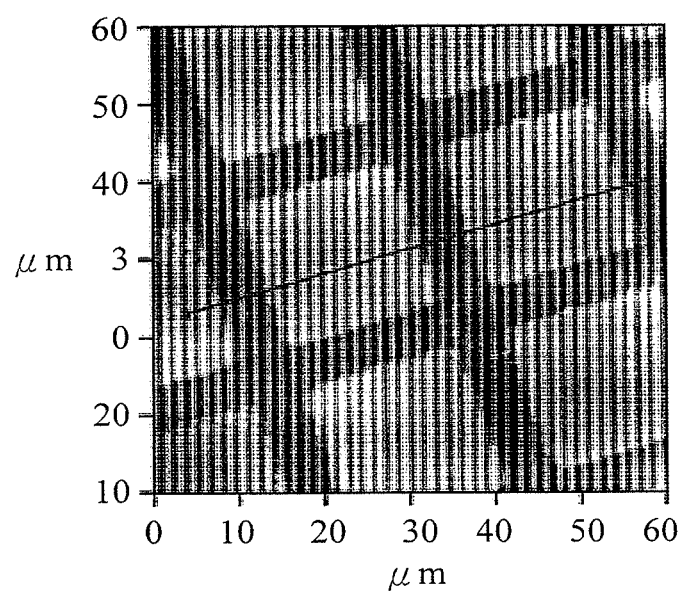
FIG. 3A to FIG. 3D show AFM images of a patterned 3D PDMS surface in accordance with the invention.
Figure 3B:
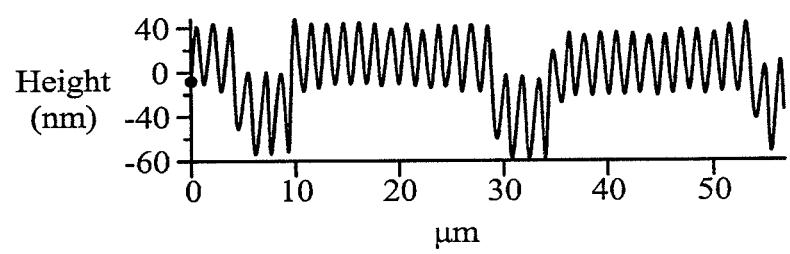

FIG. 3A is a topographic image of the sample 10 in Example 2. FIG. 3B is a height profile across the line scan shown in FIG. 3A. As shown in FIG. 3A, the black colored regions are higher than the gray colored regions and the differences in height are about 120 nm. Therefore, the physical patterns (differences in height) were fabricated by the patterning method of the invention.

Figure 3C:
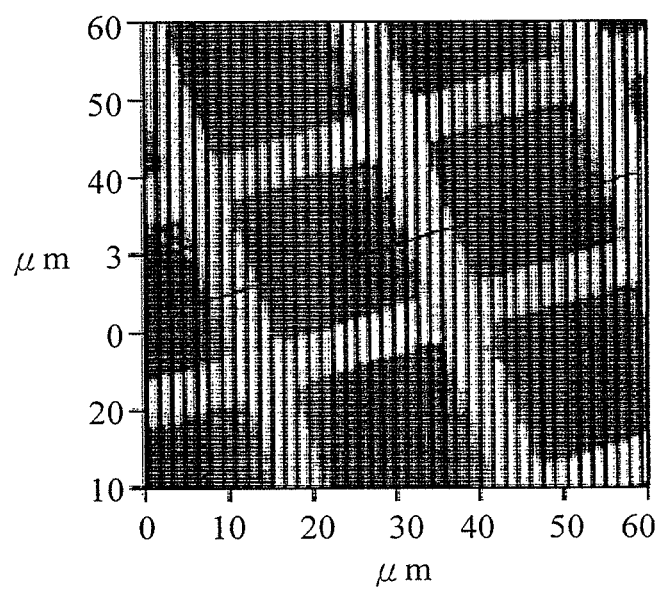
Figure 3D:
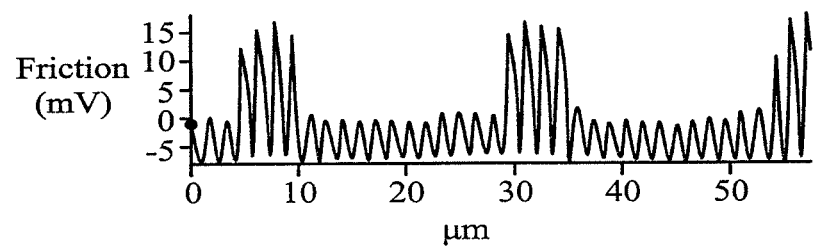

FIG. 3C is a frication image of the sample 10 in Example 2. FIG. 3D is a friction distribution across the line scan shown in FIG. 3C. As shown in FIG. 3C, the frictions of the gray colored regions are higher than that of the black colored regions. The results show that the hydrophilicity of the covered regions is higher than that of the exposed regions. Therefore, the specific chemical patterns (hydrophilicity) on the polymer layer were fabricated by the patterning method of the invention.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for patterning a polymer surface, comprising:
providing a substrate;
forming a polymer layer on the substrate;
applying deionized water on the polymer layer;
after applying deionized water on the polymer layer, placing a conductive grid on the polymer layer, wherein the conductive grid has a mesh pattern;
after placing the conductive grid on the polymer layer, using nitrogen gas to dry the deionized water;
performing a plasma treatment on the polymer layer to transfer the mesh pattern to the polymer layer, wherein the transferred mesh pattern comprises a plurality of trenches or hills formed in the polymer layer to produce hydrophilicity differences and height differences of the polymer layer; and
removing the conductive grid.

2. The method for patterning a polymer surface as claimed in claim 1, wherein the substrate comprises a glass or plastic substrate.

3. The method for patterning a polymer surface as claimed in claim 1, wherein the polymer layer comprises polydimethylsiloxane (PDMS), poly(methyl methacrylate) (PMMA), poly(3,4-ethylenedioxythiophene): poly(styrenesulfonate) (PEDOT:PSS), polyvinyl alcohol (PVA), (polyvinyl carbazole (PVK), polytetrafluoroethylene (PTFE), polyethyleneimine (PEI), polystyrene (PS) or polyethylene terephthalate (PET).

4. The method for patterning a polymer surface as claimed in claim 1, wherein the conductive grid is a metal grid.

5. The method for patterning a polymer surface as claimed in claim 4, wherein the metal grid is copper, gold, molybdenum, nickel or combinations thereof.

6. The method for patterning a polymer surface as claimed in claim 1, wherein the mesh pattern comprises a rectangular, rhombus, circular, or polygon shape.

7. The method for patterning a polymer surface as claimed in claim 1, wherein the mesh pattern formed in the polymer layer have differences in height of about 5 nm to 150 nm.

8. The method for patterning a polymer surface as claimed in claim 1, wherein the polymer layer directly under the conductive grid has a higher hydrophilicity than that outside of the conductive grid after the plasma treatment.

9. The method for patterning a polymer surface as claimed in claim 1, wherein a water contact angle of the polymer is decreased after the plasma treatment.

10. The method for patterning a polymer surface as claimed in claim 1, wherein the plasma treatment is an air plasma treatment.

11. The method for patterning a polymer surface as claimed in claim 10, wherein the air plasma treatment is conducted under a power of about 2 W to 30 W.

12. The method for patterning a polymer surface as claimed in claim 10, wherein the air plasma treatment is conducted under an exposure time of 0.5 minutes to 10 minutes.

13. The method for patterning a polymer surface as claimed in claim 10, wherein the air plasma treatment is conducted under a pressure of about 5 Pa to 200 Pa.

* * * * *